(12) United States Patent
Danville et al.

(10) Patent No.: US 10,271,646 B2
(45) Date of Patent: Apr. 30, 2019

(54) RAIL OR BAR ORGANIZER SYSTEM

(71) Applicant: AMAX INCORPORATED, East Greenwich, RI (US)

(72) Inventors: Dennis Danville, Chepachet, RI (US); Patrick Nolan, Royersford, PA (US); Noah Dingler, Phoenixville, PA (US); Andrew J. Miller, Phoenixville, PA (US); Michael A. Dotsey, Chester Springs, PA (US); Bryan Fitzgerald Allard, West Chester, PA (US)

(73) Assignee: AMAX INCORPORATED, East Greenwich, RI (US)

( * ) Notice: Subject to any disclaimer, the term of this patent is extended or adjusted under 35 U.S.C. 154(b) by 178 days.

(21) Appl. No.: 15/335,394

(22) Filed: Oct. 26, 2016

(65) Prior Publication Data

US 2017/0112275 A1 Apr. 27, 2017

Related U.S. Application Data

(60) Provisional application No. 62/246,590, filed on Oct. 26, 2015.

(51) Int. Cl.
| | |
|---|---|
| A47B 83/00 | (2006.01) |
| A47B 96/06 | (2006.01) |
| A47B 21/06 | (2006.01) |
| A47B 17/03 | (2006.01) |
| A47B 21/03 | (2006.01) |
| A47B 97/00 | (2006.01) |
| H02G 3/04 | (2006.01) |

(52) U.S. Cl.
CPC ............ *A47B 83/001* (2013.01); *A47B 17/03* (2013.01); *A47B 21/03* (2013.01); *A47B 21/06* (2013.01); *A47B 96/067* (2013.01); *A47B 97/00* (2013.01); *A47B 2021/064* (2013.01); *A47B 2097/003* (2013.01); *A47B 2200/0085* (2013.01); *H02G 3/0437* (2013.01); *H02G 3/0487* (2013.01)

(58) Field of Classification Search
CPC . A47B 21/06; A47B 2020/064; A47B 96/067; A47B 2097/003; A47B 83/001; H02G 3/0437; H02G 3/0487
USPC ...................... 174/495, 500, 503; 108/29, 30
See application file for complete search history.

(56) References Cited

U.S. PATENT DOCUMENTS

| | | | |
|---|---|---|---|
| 4,740,044 A | 4/1988 | Taylor | |
| 4,828,120 A * | 5/1989 | Beil | ........................ A47B 57/42 211/126.1 |
| 5,775,521 A | 7/1998 | Tisbo | |

(Continued)

*Primary Examiner* — Robert Canfield
(74) *Attorney, Agent, or Firm* — Paul Y. Feng; One LLP

(57) ABSTRACT

An office desktop organizer system including a rigid, tubular section with a triangular cross-section joinable with more sections in series via a connector joint in between sections and end caps covering the opposite ends of the tubular sections. The connector joints may be straight or have a bend. Add on office implements, such as a storage shelf, a drawer, a pencil box, a tape dispenser, a bin, a phone dock, a note pad stand, a USB port, or an AC outlet power center, each having an overarching arm, are connectable to the tubular section by engaging the overarching arm thereto. Eyelets in the end caps and connector joints allow the tubular section to be mounted to a wall using a screw, push pins, tape, etc. where the screw or pin head fits into the eyelet.

20 Claims, 24 Drawing Sheets

(56) References Cited

U.S. PATENT DOCUMENTS

| | | | | |
|---|---|---|---|---|
| 5,853,236 A * | 12/1998 | Rogers | ............... | A47B 21/06 312/223.6 |
| 5,877,451 A * | 3/1999 | Zimmerman | ........ | H02G 3/0425 174/68.3 |
| 6,267,338 B1 * | 7/2001 | Saylor | ............... | A47B 17/033 108/44 |
| 6,792,876 B2 * | 9/2004 | Lin | ............... | A47B 21/0314 108/29 |
| 7,185,767 B2 * | 3/2007 | Phillips | ............ | A47B 17/03 211/11 |
| 7,641,056 B2 | 1/2010 | Schulman | | |
| 7,963,593 B2 | 6/2011 | Mitchell | | |
| 8,276,523 B2 * | 10/2012 | Miller | ............... | A47B 21/00 108/50.02 |
| 2007/0294953 A1 * | 12/2007 | Guillen | ............ | A47B 57/40 52/36.1 |
| 2009/0255702 A1 | 10/2009 | Mitchell | | |
| 2013/0180202 A1 * | 7/2013 | Woods | ............ | A47B 5/00 52/710 |

* cited by examiner

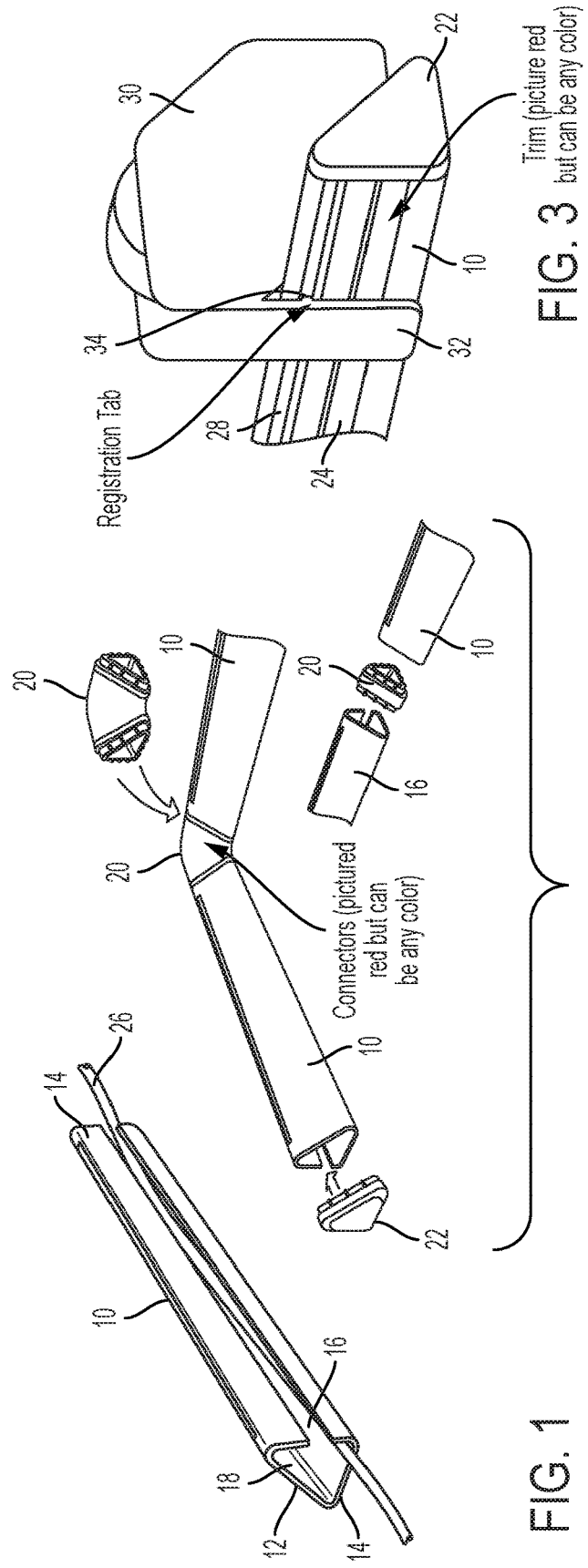

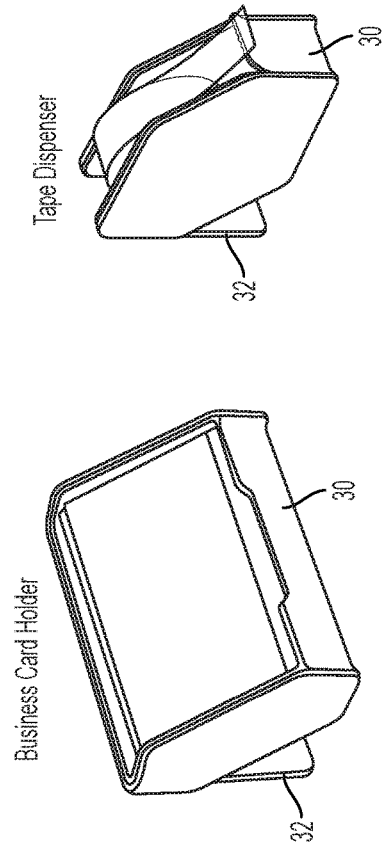
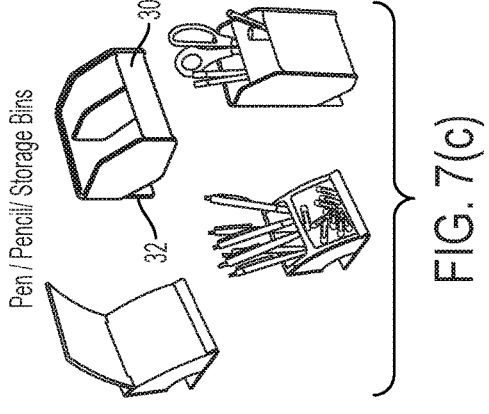
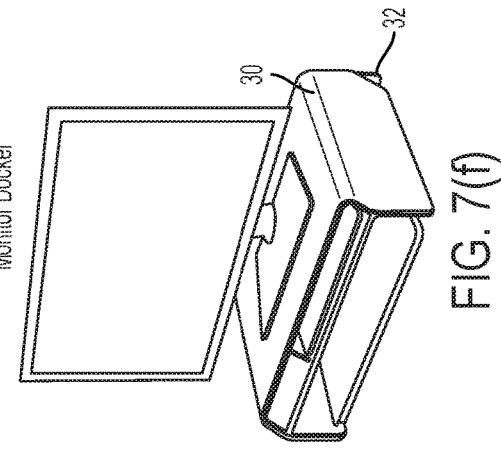
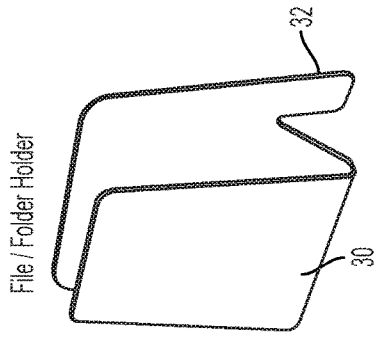

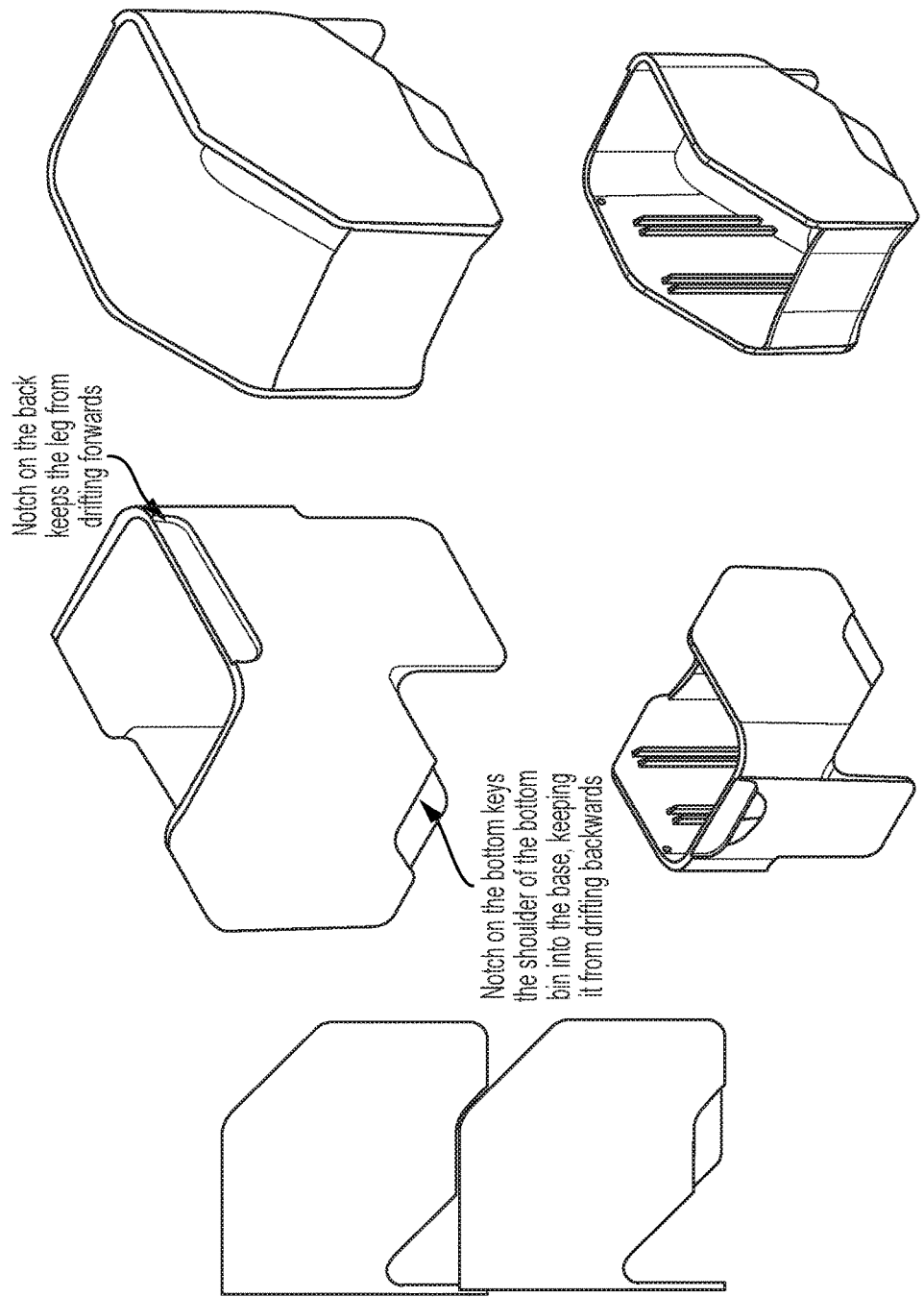

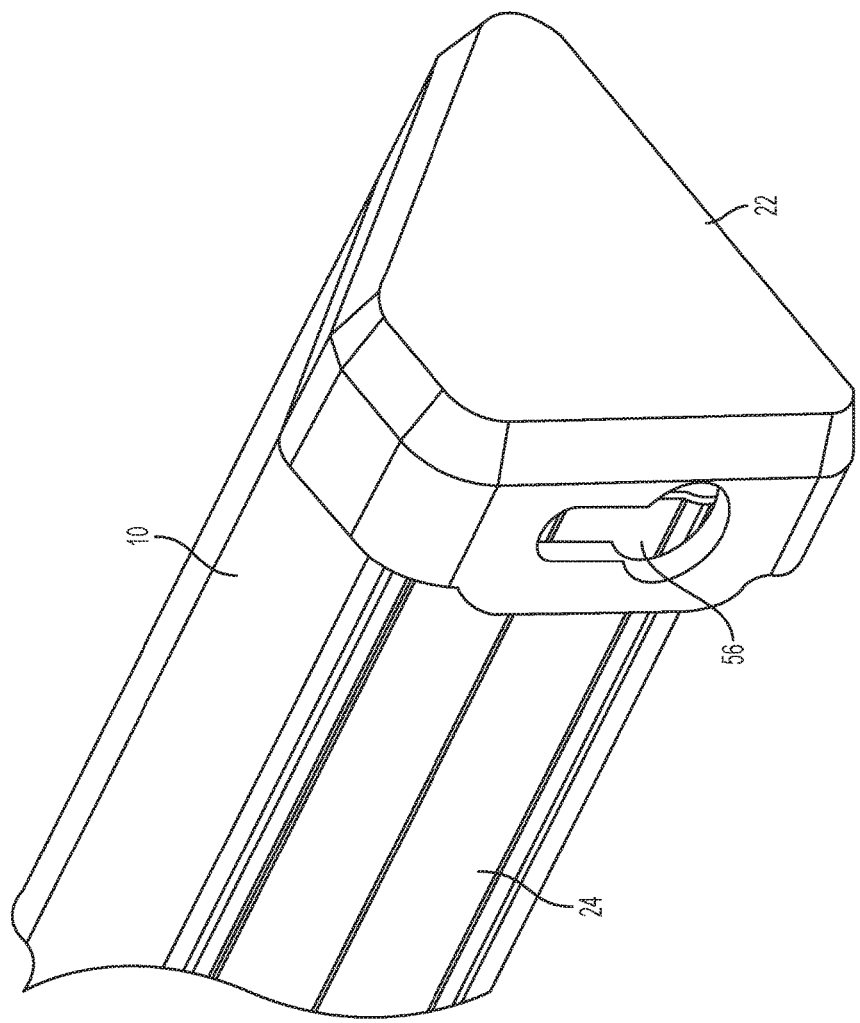

Connectors and end cap (Red) extend backward to offset the rail from a wall, giving affordance for placing items

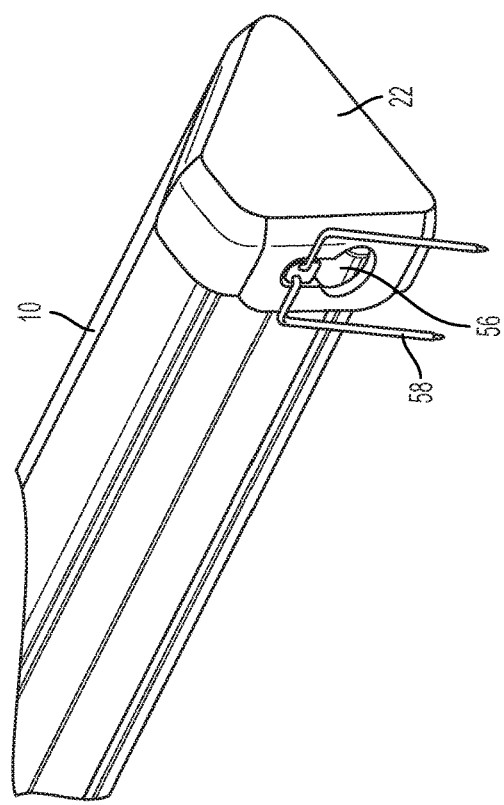
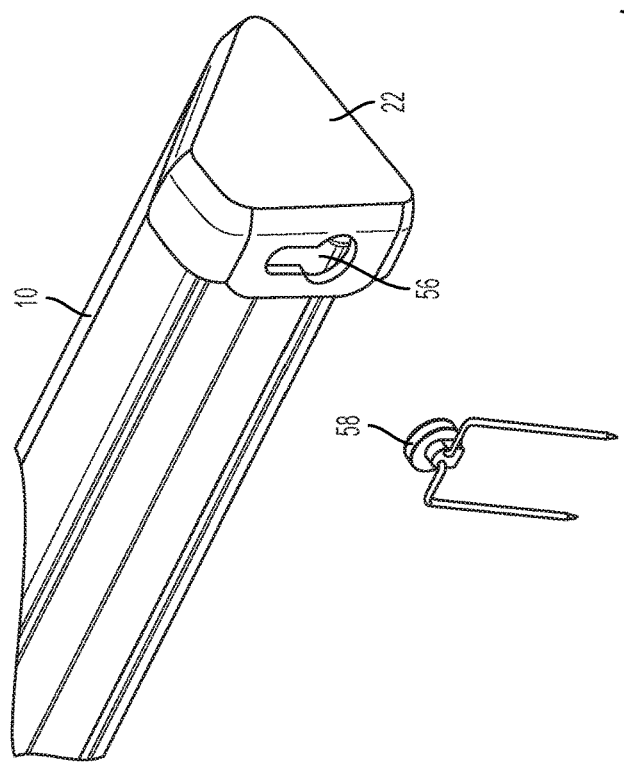
FIG. 16(g)
FIG. 16(h)

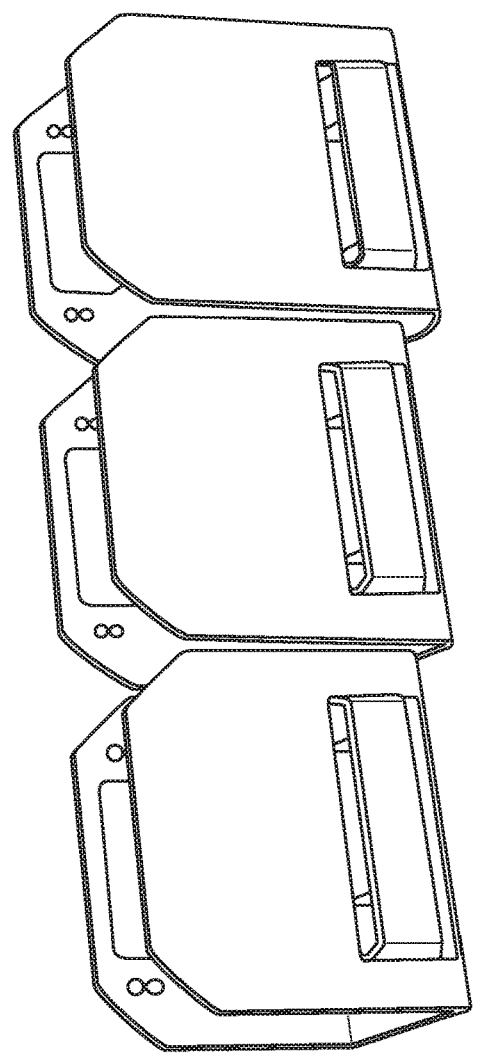
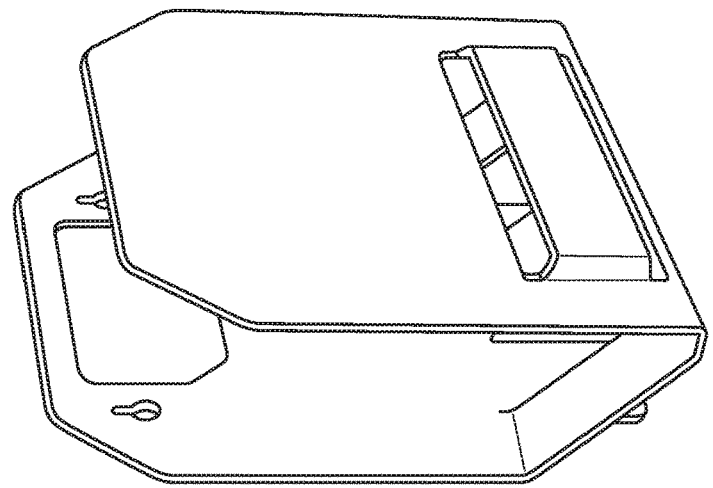
Hanging Folder
FIG. 25

RAIL OR BAR ORGANIZER SYSTEM

CROSS-REFERENCE TO RELATED APPLICATIONS

This non-provisional application claims benefit of priority from U.S. provisional application No. 62/246,590, filed on Oct. 26, 2015, the contents of which are hereby incorporated by reference.

FIELD OF THE INVENTION

The present invention relates to a system for organizing and efficient use of one's office workstation and specifically the desktop surface.

BACKGROUND

Desktop organizers are commonly found in big box office supply stores. One such organizer has three or more tiered trays, with small pencil or knickknack boxes, and vertical slots integrated with the trays. This design allows the user to organize his or her mail, loose papers, file folders, etc., either horizontally or vertically. These organizers are typically made from sheets of translucent plastic or may have a wire frame with mesh side walls or trays. Other organizers are simple racks for sorting and storing paper files vertically. Desktop organizers may also be in the form of a translucent plastic cabinet with pull out drawers for holding paper clips, erasers, pens, scissors, staplers, rubber bands, etc. A rolled taper dispenser, a sticky note dispenser, and a reading lamp have been integrated with such organizers. With the proliferation of desktop computers, some computer monitor stands include desktop organization features, such as drawers, a pencil box, file shelves, etc.

SUMMARY OF THE INVENTION

In a preferred embodiment, the present invention is directed to an office organizer system for a workstation including a desktop and a wall, comprising a first rigid, elongated, tubular section having a polygonal cross-section with a plurality of faces, wherein the tubular section includes a first end and a second end, a slot extending lengthwise along one of the faces of the section, and an attachment means extending lengthwise along one of the faces of the section; an elongated cover strip including a hooked lip removably attached to the slot; a first connector having a cross-section matching the polygonal cross-section of the tubular section fitted to the first end of the tubular section, wherein the first connector includes at least one of a closed end and a flexible angle bend with an included angle of 0 degrees to 90 degrees, and the first connector having a wall attachment means attachable to the wall; a second connector, having a cross-section matching the polygonal cross-section of the tubular section fitted to the second end of the tubular section, wherein the second connector includes at least one of a closed end and a flexible right-angle bend, and the second connector having a wall attachment means attachable to the wall; and an add-on office implement having an overarching arm that at least partially overlies the tubular section and engages the attachment means of the tubular section.

The polygonal cross-section is preferably a right-angle triangle so that it sits flat on one face with the hypotenuse face angled toward the user. A single tubular section may be used by itself, or a plurality of tubular sections can be linked together in series interconnected by a first or second connector. The connectors may preferably be straight or include a bend ranging from 0-360 degrees.

Further, the add-on office implement may be a storage shelf, a drawer, a pencil box, a tape dispenser, a USB port, a bin, a phone dock, a note pad stand, a sticky note pad, an AC outlet, a smartphone charging station, etc., or any combination thereof. Spaced apart openings are provided in the tubular section that face the user for access to the interior of the tubular section for cable or plug access.

BRIEF DESCRIPTION OF THE DRAWINGS

FIG. 1 is a preferred embodiment tubular section or rail.
FIG. 2 shows end caps and interconnect joints used to link up two or more tubular sections.
FIG. 3 shows an office implement attached to the rail.
FIGS. 7(a)-7(i) show different office implements or accessories.
FIGS. 9-10 show different bins attachable to the rail.
FIGS. 16(a)-16(l) show different structures for mounting the rail to the wall.
FIG. 23-25 show various embodiments of hanging folders attachable to the rail or a wall.

DETAILED DESCRIPTION OF THE PREFERRED EMBODIMENTS

Figure 5:
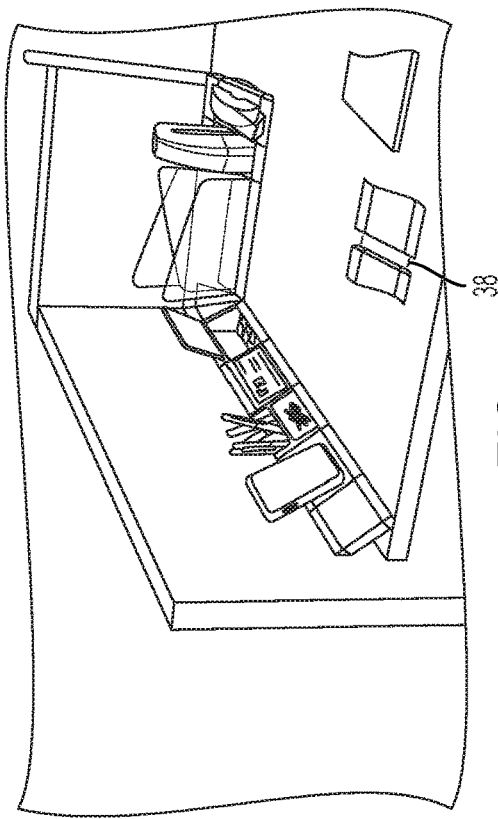
FIG. 5 shows use of magnets to join the rail and add on office implements.

The present invention in a preferred embodiment is directed to an office organizer for use on a workstation desktop with or without a wall or divider. The present invention system organizes the myriad of computer wires, Ethernet cables, printer cables, power cables, speaker cables, office supplies (paper clips, sticky notes, push pins, note pads, etc.), sheet form documents and files, and office tools (scissors, hole punch, staplers, tape dispenser, etc.) found on a typical desktop into a neat and organized layout for quick and easy access. The system is preferably located at the outer periphery of the desktop to improve the size the work area and declutters the work area. The system can also be mounted to a wall or divider to further free up desk surface space.

In a preferred embodiment shown in FIG. 1, the system is built around a tubular section 10, also called a rail or bar. The tubular section has a polygonal cross-section, and preferably a triangular cross-section and more preferably a right-triangular cross-section (i.e., containing a 90-degree angle). The polygonal cross-section is preferred due to the multiple flat faces which help stabilize the tubular section on a desktop. A right-triangular cross-section is preferred, because the face 12 that coincides with the hypotenuse of the triangle can be arrange ergonomically to be oriented toward the user when the tubular section 10 rests on a desktop on one of the right-angle-adjacent legs/faces 14 of the triangle. The other right angle leg/face 14 is thus oriented vertically so the tubular section 10 can be pushed flush against a wall, or can be mounted flush against a wall or divider of a workstation.

Further, the triangular cross-section is preferable because of its strength in bending. Office implements, described below, each having mass will be mounted to the tubular section which may itself be mounted to a wall by its ends. Hence, with all of this weight loading on the tubular section, loading good structural rigidity, good hoop strength and bending strength are preferred to provide solid support.

Along the length of one of the right-angle-adjacent legs/faces 14 is a slot opening 16. The slot opening 16 allows electrical, data, computer cables 26 to be passed into the hollow interior 18 of the tubular section 10 and neatly held inside.

The right-triangle cross-section of the tubular section 10 is preferred. Of course, a square, rectangular, hexagonal, etc. cross-sections are contemplated as well as non-regular shapes such as a rhombus, a trapezoid, and even an oval with flat surfaces or irregular shapes.

The unit tubular section 10 can be used on its own. It is preferably made in lengths of, e.g., 6 inches, 12 inches, 18 inches, 24 inches, or longer and cut to the desired length. In FIG. 2, the tubular section 10 can also be linked together in series with other tubular sections 10 that preferably have the same cross-sectional shape, although changing cross-sectional shapes and sizes are contemplated. Interconnect joints 20 join the ends of two tubular sections 10 to create the link as seen in FIG. 2. A series of many tubular sections 10 can be linked together using the interconnect joints 20.

Each interconnect joint 20 is preferably made from a flexible material. It may have a pre-formed straight shape or a pre-formed 90-degree bend, or may be bent to any angle as the user desires to fit his or her desktop organization desires for the series of linked tubular sections. The material is selected so there is resilience for bending yet not so much to resist bending or causing a bias to return to its original, factory-set shape if later bent by the user. The interconnect joint 20 is hollow and preferably has a cross-section to match the cross-sectional shape of the tubular members 10 for a flush, finished appearance. The opposite ends of the interconnect joint have a reduced outside dimension so it can plug into the ends of the tubular sections 10 to be joined with an interference or friction fit.

As seen in FIG. 2, end caps 22 having the same construction as the interconnect joint except one end is sealed off to enclose one end of a tubular section 10. The end caps provide a more finished appearance for the system. The interconnect joint 20 and end caps 22 in the preferred embodiment further provide mounting sites for attaching the tubular sections to a wall, which is described in more detail below. Further, the interconnect joints 20 and end caps 22 (generally, the connectors) preferably all have a design that allows power wires to enter, exit, and flow through. They may be designed to sit over the top of desktop power wire holes. These connectors can range in motion from 0 to 360 degrees and can have closed ends (end cap) or can be open (in-line extender).

Figure 16C:
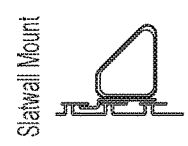
Figure 16B:
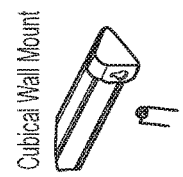
Figure 16A:
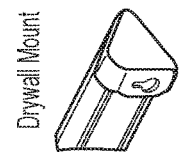
Figure 16E:
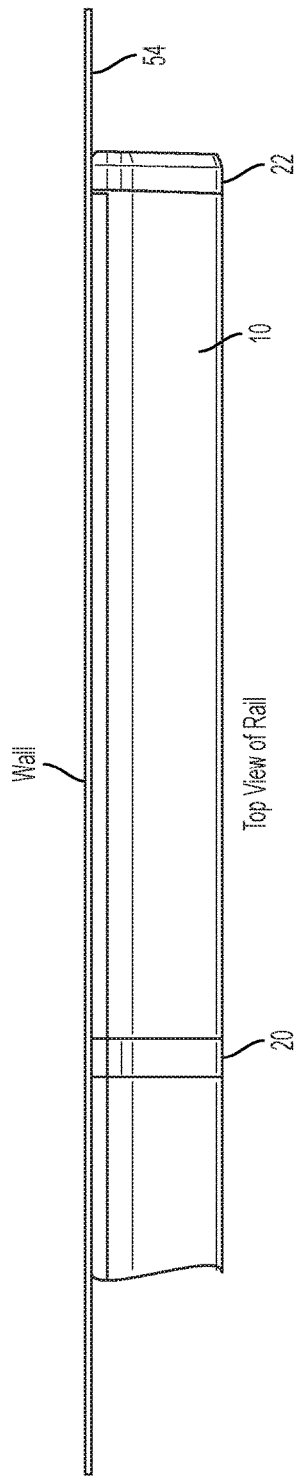
Figure 16F:
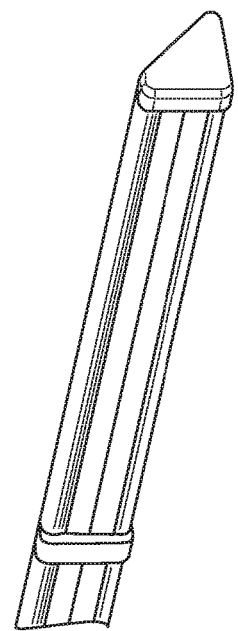
Figure 16J:
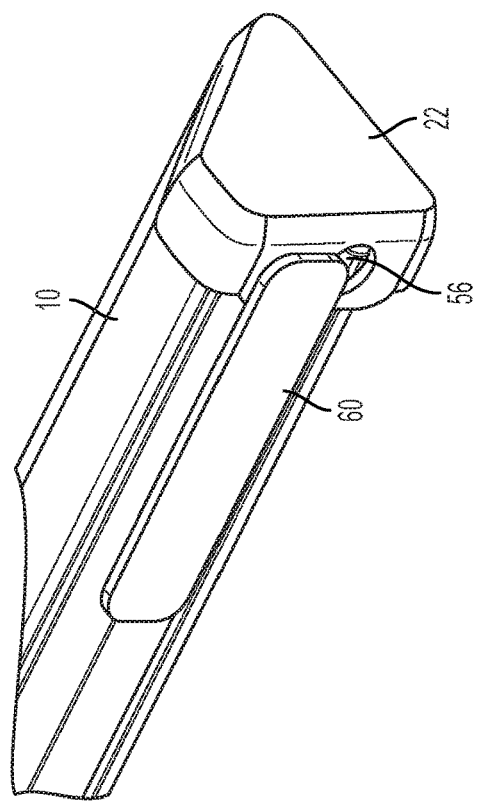
Figure 16I:
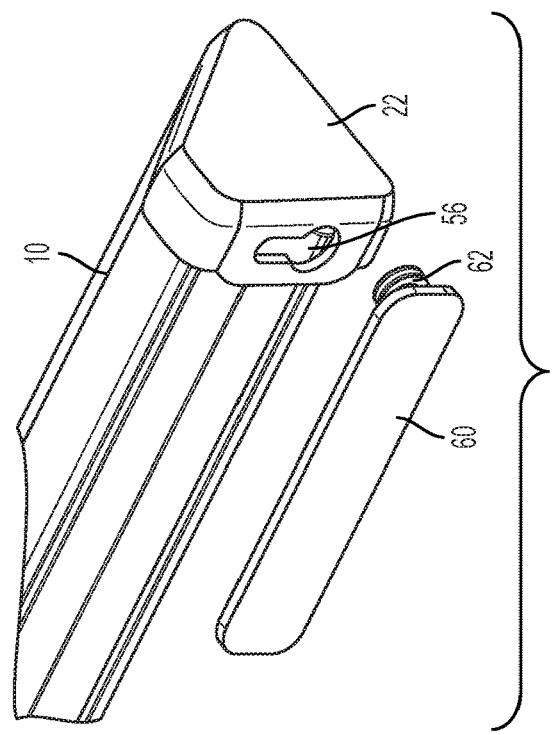
Figure 16L:
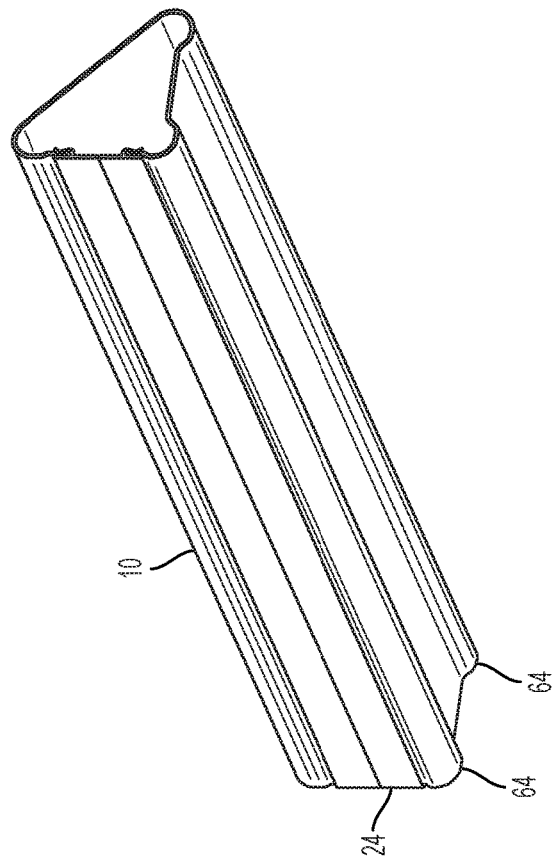
Figure 16K:
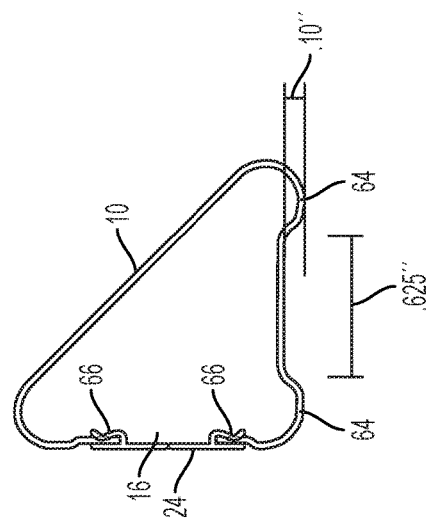

In FIGS. 3, 16(k), and 16(l), an elongated cover strip 24 is used to cover the open slot 16 in the tubular section 10. The cover strip 24 is made from a semi-rigid material and snaps into place using clamps 66 engaging the lip around the slot opening 16. Other types of mechanical engagement are contemplated. This gives the tubular section a finished appearance as well as containing the tangle of cables inside the tubular section. The cover strip 24 further adds structural rigidity to the tubular section 10 especially when multiple office implements are docked to the tubular section 10.

At one of the right-angle faces 14, along its length or spaced apart along its length, is an attachment means 28. In the preferred embodiment, the attachment means is a U-channel 28. An add-on office implement 30, in FIG. 3, a tape roll dispenser is docked to the tubular section 10. The office implement 30 features a mounting mechanism, preferably an overarching arm 32 which reaches over the top vertex of triangular tubular section 10 to mount thereto on the rear face as seen in FIG. 3. An optional registration tab 34 toward the distal end of the overarching arm 32 snaps into the U-channel 28. The overarching arm 32 thus holds the office implement/tape dispenser 30 against the tubular section 10. The attachment means 28 can also be a ridge, lip, L shaped channel, hook, groove, or the like to allow the tab 34 to latch thereto. The office implement 30 can be detached from the tubular section 10 by bending the somewhat resilience overarching arm 32 thus moving the registration tab out of the U-channel and lifting the office implement 30.

In sum, the tubular section or rail 10 of the present system is preferably used to dock and create storage solutions for an office workstation. The system provides at least two essential things: it helps to organize wires on the desktop, and acts as a storage docking station/rail/bar for individual storage solutions. The docking features adds utility by helping the consumer easily organize his or her storage solutions. It also helps to provide weight and stability to items like tape dispensers, coffee cups, and vertical files that are unstable standing on their own and oftentimes tip over.

The tubular section 10 is preferably somewhat rigid in that it should have sufficient structural, bending, and hoop strength, because it must support multiple office implements having mass that are mounted to it. Materials exhibiting such properties include bent sheet metal, extruded metal such as aluminum, magnesium, steel, fiberglass, or plastic, composite plastics, acrylic nylon, injection molded plastic, forged metal, or cast metal. It can be any shape with one more side faces including but not limited to triangular, square, rectangular, or any type of polygonal shape. The tubular section may have decorative trim, cover strip 24, end caps 22, and interconnect joints 20 made preferably from TPR, TPE, composite polymers, acrylic nylon, nylon, extruded metals, forged metal, cast metal, wood, any type of wood composite, or any combination thereof.

Figure 4:
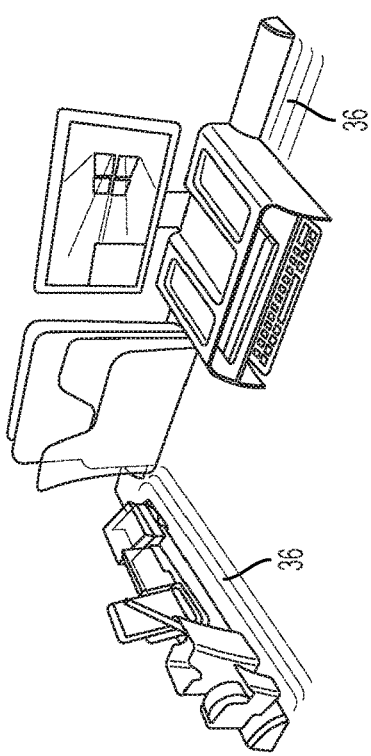
FIG. 4 shows LED lighting incorporated to the rail.

FIG. 4 is an alternative embodiment office organizer rail system that includes LEDs 36 for ambient or accent lighting. Individual LEDs or LED strips 36 may be mounted along the length of the tubular sections 10 to illuminate the surrounding desktop. The electrical wiring, transformers, drivers, etc., powering the LEDs are contained inside the tubular sections and wired to a central power supply. The LED lights could be random colors or be set by the user depending on the mood, office decor, or status of the user. The tubular sections 10 carry electrical cables through them so accessories docked on the tubular sections are connected to electrical power just through docking the accessories. The LEDs may provide task lighting if the rail 10 is installed on a wall, cubicle wall, or if the rails are mounted by some other technique known in the art above the desk or work surface.

The task lighting would be integrated to the bottom of the rail, and provide light to the desktop or work surface.

FIG. 5 is an alternative embodiment where magnets 38 are added to the end caps 22 and interconnect joints 20. If the tubular sections 10 are made from a ferromagnetic material such as steel, then several tubular sections may be joined using magnet attraction. Further, the office implements may include magnets that easily attach to the metal tubular sections 10.

Figure 6B:
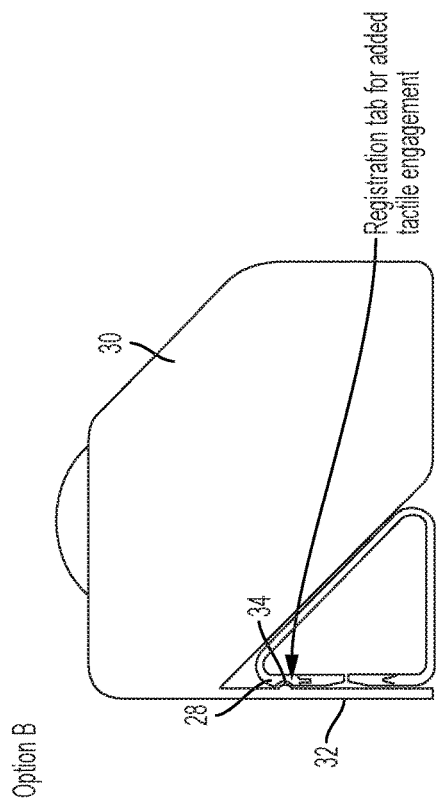
FIGS. 6(a)-6(d) show various methods for attaching office implements to the rail.
Figure 6A:
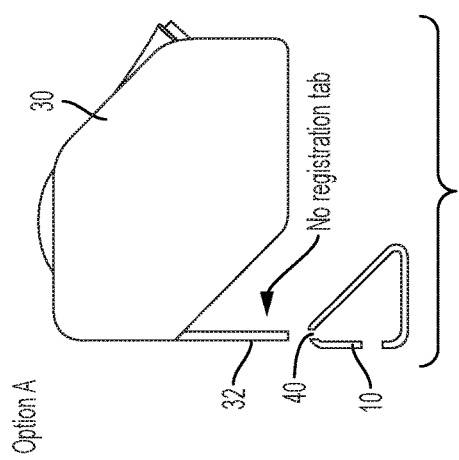

FIGS. 6(a)-6(d) show alternative embodiments of the attachment means for attaching the office implement 30, e.g., tape dispenser or other accessory, to the tubular section 10. In FIG. 6(a), the overarching arm 32 can simply slide into the tubular section 10 through an opening 40 at the top of the tubular section 10. Or a registration tab 34 on the interior of the overarching arm 32 engages a U-channel 28 and holds the add-on office implement or accessories 30 to the tubular section 10, FIG. 6(b). The add-on office implement or accessories 30 can have any geometry and size dimension to connect to the rail system, i.e., from the top, back, front, or bottom as illustrated in FIGS. 6(a)-6(d).

Figure 6D:
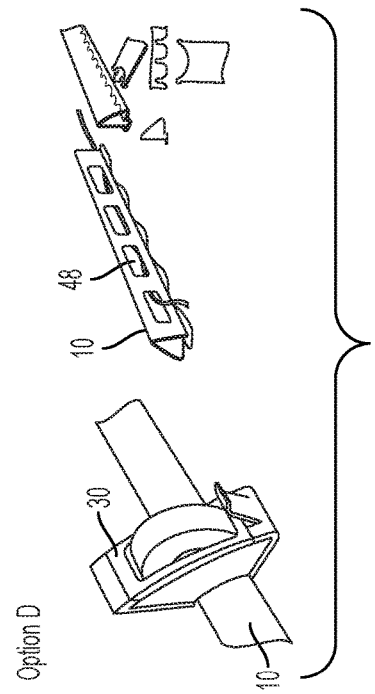
Figure 6C:
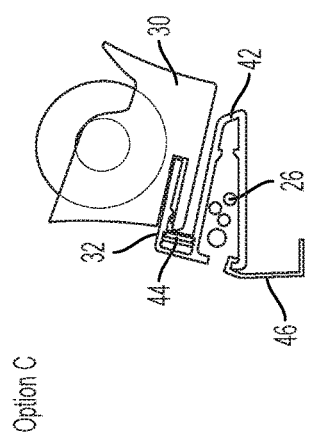

FIG. 6(c) shows an alternative embodiment tubular section or rail 42 that has more of a flattened triangle cross-section. Cables 26 are still contained inside. The office implement/tape dispenser 30 is mounted again using an overarching arm 32, but it slides into an L-shaped slot or attachment means 44 for locking engagement.

In FIG. 6(c), the tubular section or rail system 42 can connect to the desktop surface through a variety of ways, including screw-mounting, glue, adhesive, double-sided adhesive tape, and/or clip 46 mounted to the desk with no fasteners. It can be mounted on the back, middle, front, or anywhere on a desk surface. It can be mounted on desks or conference tables back-to-back in any lengths. Furthermore, the tubular section or rail system can be mounted to an office drywall, a cubicle wall, a divider, or to an existing storage system mounted to a cubicle wall.

FIG. 6(d) shows an alternative embodiment wherein the rail or tubular section 10 includes spaced-apart openings 48 along the length of the rail. These openings 48 are ports that allow user access to the interior of the interior of the tubular section. The openings may be located on a front face or a rear face of the tubular section. FIG. 6(d) also shows a different view of the office implement 30 mounted to the tubular section 10.

The desktop organizer tubular section or rail 10 is intend to dock various office implements or accessories 30. FIGS. 7(a)-7(i) show such accessories including a business card holder, tape dispenser, pen/pencil/storage bins, sticky note holder or writing pad, file and folder holder or shelf, a PC monitor dock, a removable whiteboard stand, a drop bin for holding notes or business cards, and a pen rack 50 seen in FIG. 7(i). The pen rack 50 in the preferred embodiment is a straight bar with vertically arranged cradles to hold pens thereon. The bottom of the pen rack 50 is inserted through the opening 50 at the top of the tubular section 10 holding the rack upright. The pen rack 50 is preferably made of flexible material and can be a storage solution for anything like pens, pencils, keys, phones, or other accessories.

The attachable, detachable, docking method for these accessories 30 is preferably via the use of an overarching arm 32. Other docking methods contemplated include magnets, Velcro, or other mechanical engagements known in the art.

Figure 7I:
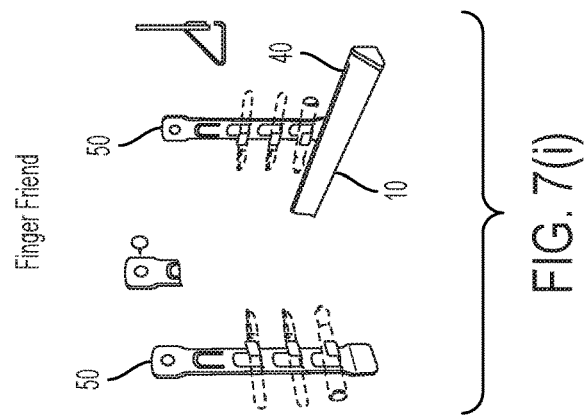
Figure 7H:
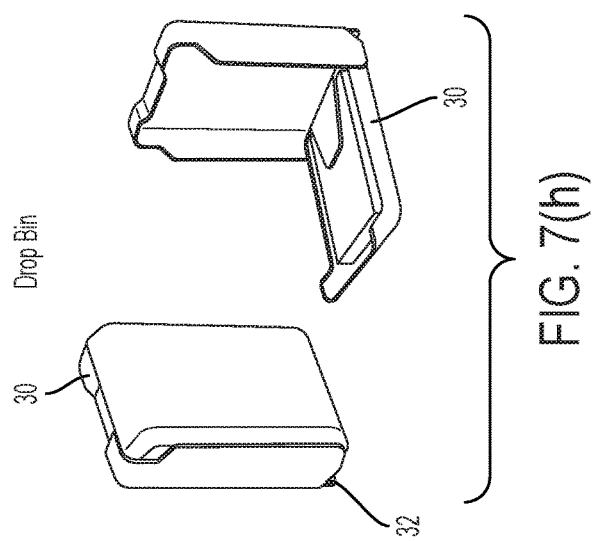
Figure 7G:
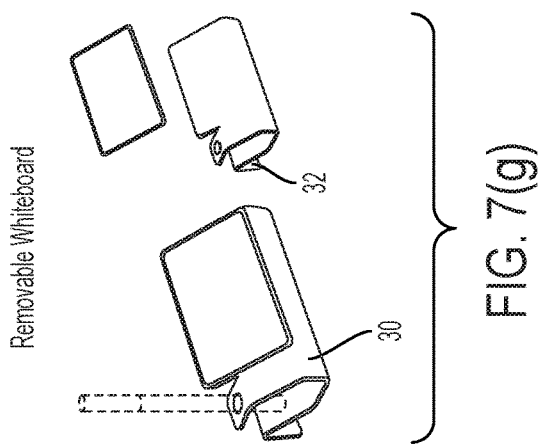

The drop bin of FIG. 7(h) is a storage solution that can help to organize papers, files, folders, cups, bins, or other accessories inside it. It could be fabricated with or without internal shelves. It can be secured to the rail system with the overarching arm, Velcro, magnets, or mechanical engagement (i.e., screws, nails) to a cubicle desktop, office divider, or office walls. It can also house a small whiteboards, calendars, or task management accessories on its front.

Figure 8C:
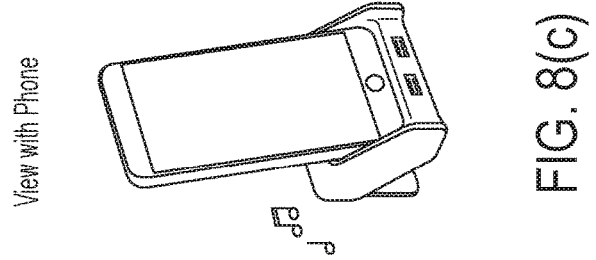
FIGS. 8(a)-8(c) show different powered office implements or accessories.
Figure 8B:
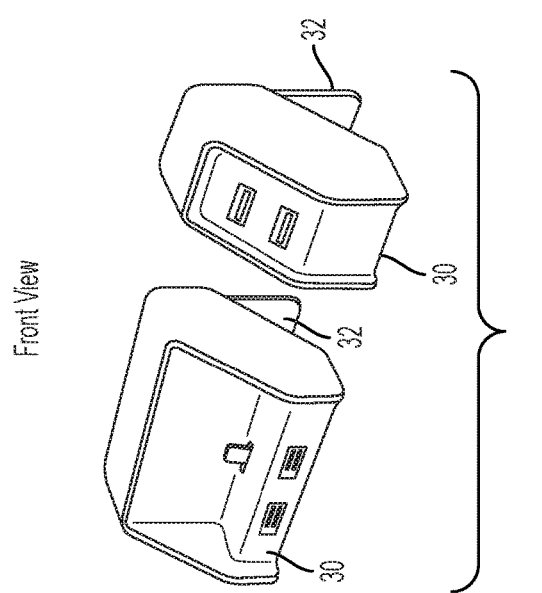
Figure 8A:
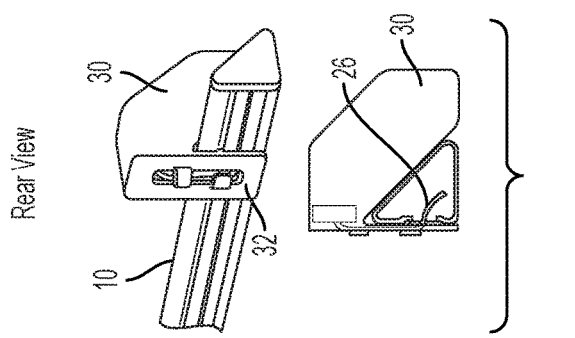

FIGS. 8(a)-8(c) show powered office implements or accessories 30. That is, these accessories 30 can be powered by their own power cord or electrical cable 26. FIG. 8(c) shows USB receptacles, SIM card slots, and like data input/output ports, arranged in one housing which is attached to the tubular section 10 via overarching arm 32 as seen in FIG. 8(a). FIG. 8(c) shows a synching and charging docking station for an iPhone or like smartphone or tablet. The docking station may include speakers for playing music or for audible notifications from the smartphone or pc.

Figure 10:
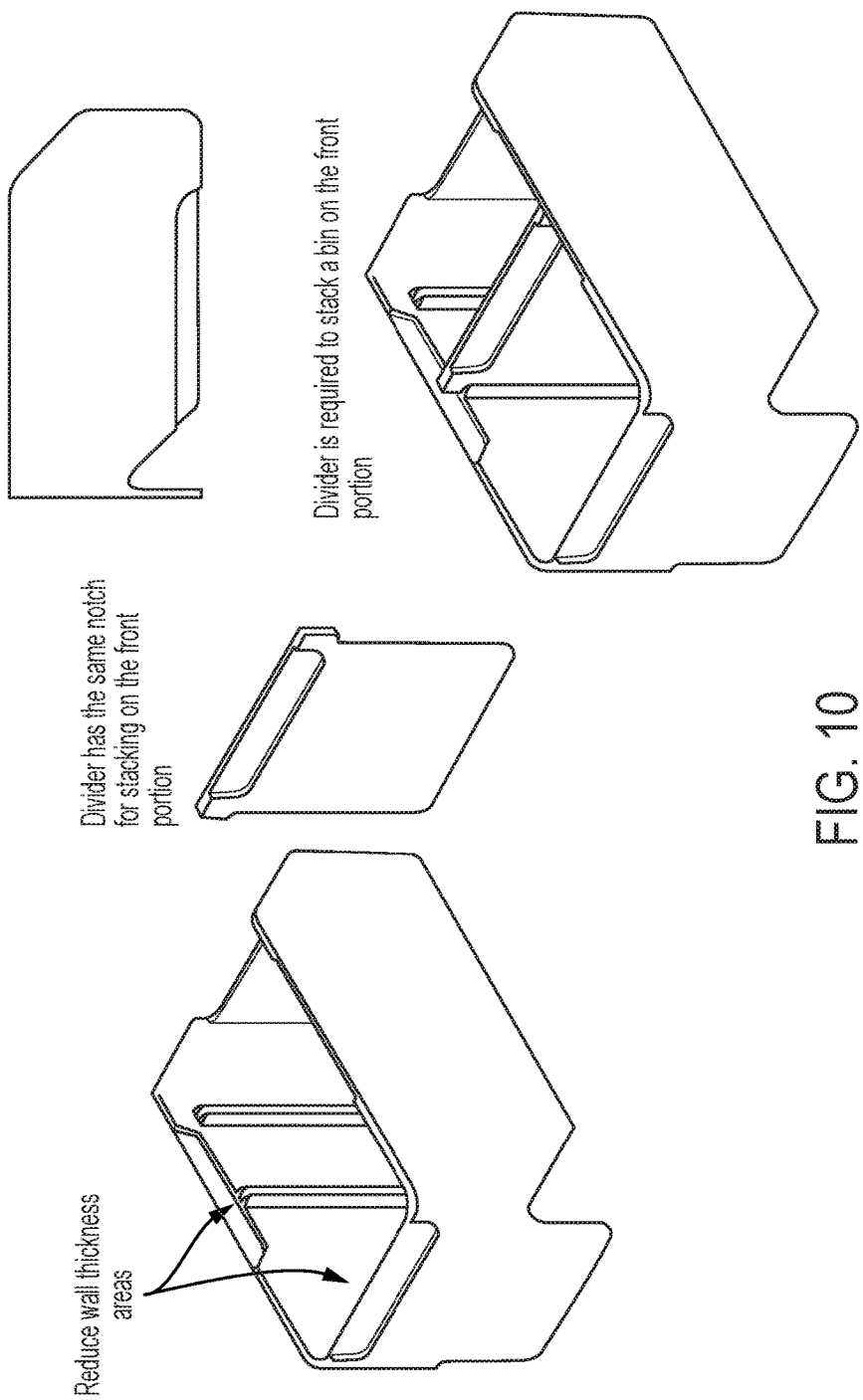
Figure 12:
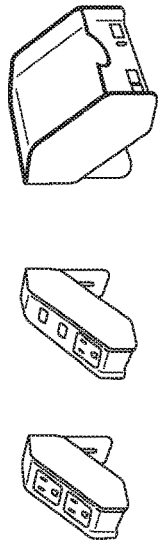
FIGS. 11-14 show still more office implements or accessories.
Figure 14:
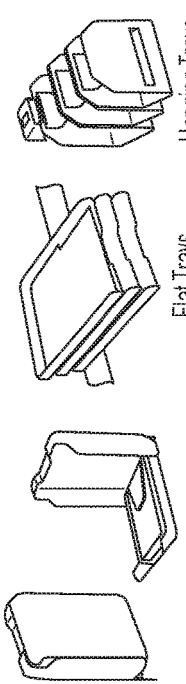
Figure 11:
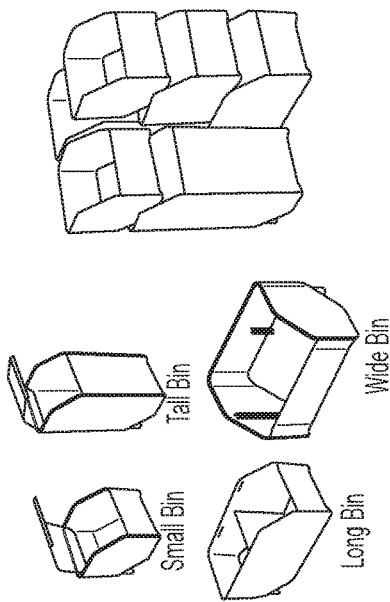
Figure 13:
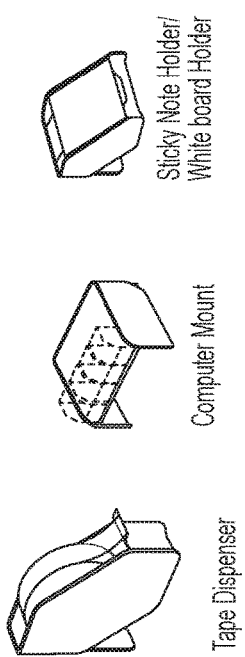

FIGS. 9-14 show more contemplated office implements 30. FIGS. 9-11 more specifically shows various bin constructions that are attachable to the rail organizer system. FIG. 12 shows alternative embodiment power stations and a phone docking station. FIG. 13 shows alternative embodiment tape dispenser, computer mount, or stand and sticky note holder. FIG. 13 shows alternative embodiment drop top storage container, flat trays for sheet paper, and hanging file trays.

Figure 15:
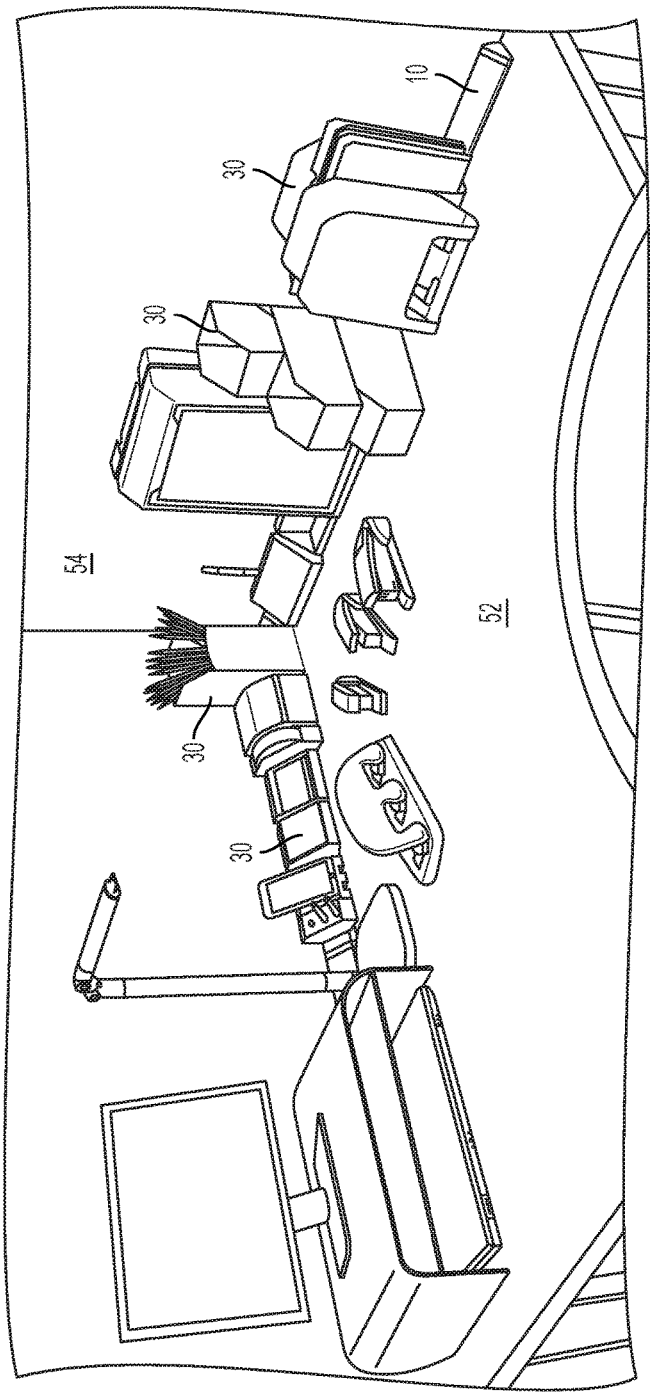
FIG. 15 shows a preferred embodiment organizer system deployed on a workstation desktop.

FIG. 15 shows a preferred embodiment of the office organizer system with many office implements 30 attached to the rail or tubular section 10. The system is arranged on a typical office desktop 52 of any workstation, preferably situated at the outer periphery of the desktop 52. The divider or wall 54 of the workstation can be seen. The present invention thus clears up clutter, opens the work space on the desktop, yet allows organized and immediate access to common office accessories by the user.

FIGS. 16(a)-16(c) show difference methods for mounting the rail or tubular section to a wall. FIG. 16(a) shows a drywall mount using an eyelet or key hole. FIG. 16(b) shows a cubicle wall mount again using a key hole. FIG. 16(c) shows a slat wall mount using L-shaped mechanical engagement to hook the rail to the wall.

FIG. 16(d) shows an end cap 22 (or an interconnect joint 20) with an eyelet or key hole 56 to enable wall mounting. In FIGS. 16(e)-16(f), in the exemplary embodiment, the end cap 22 and interconnect joint 20 each incorporates about 0.3 inch stand-off to space locating the rail 10 slightly away from the wall surface 54 for easy mounting and removal of accessories 30 as well as fishing wires. FIGS. 16(k) and 16(l) further show in a side and a perspective view the stand-off space. FIGS. 16(k) and 16(l) show optional feet 64 in the form over convex bumps to support the rail 10. Also, preferred embodiment clamps 66 on the interior of the cover strip 24 are used to attach the cover strip 24 to the elongated slot 16 in the rail 10. a3

FIG. 16(g)-16(h) show a cubicle wall mounting by use of a push pin 58. The push pin includes a large head with steel legs that are pushed into the standard cork or soft wall of a cubicle, leaving the large head exposed. The key hole 56 in the end cap 22 or interconnect joint 20 is aligned with the large head inserted therein and captured in place. For a dry wall mount, the user simply drives a nail or wood screw into the dry wall leaving the large head exposed, and the key hole 56 attaches to the exposed head.

FIGS. 16(i) and 16(j) show a method for mounting the rail to a wall using a strong adhesive tape. An anchor 60 have a flat, elongated body includes a knob 62 at one end. The anchor 60 is attached to the wall preferably with double-stick tape (or can be attached using nails or screws with permanent damage to the wall surface). The adhesive bonds the anchor 60 to the wall, and the protruding knob 62 is inserted into the key hole 56 of the end cap 22 (or interconnect joint 20) thus mounting the rail to the wall.

Figure 17:
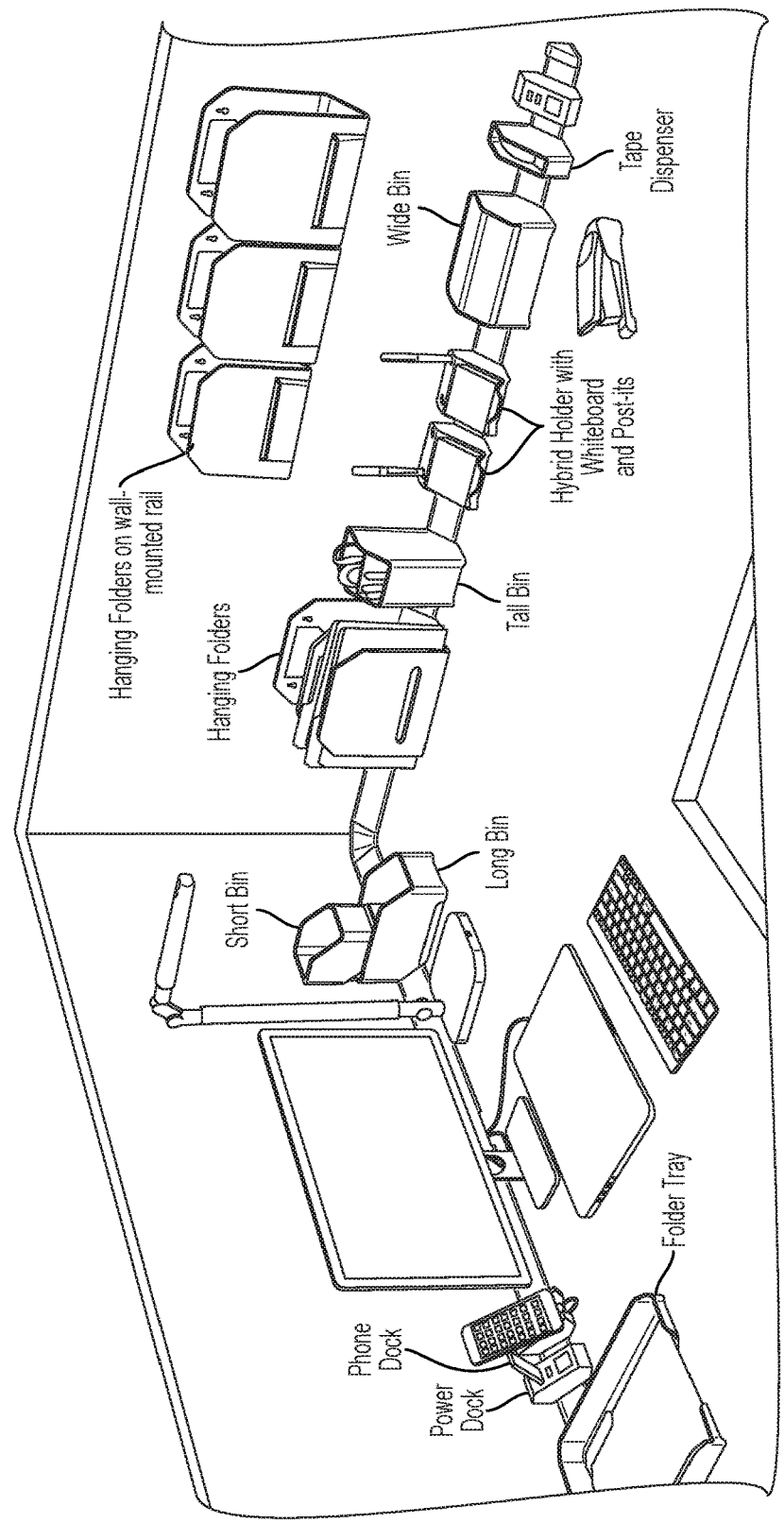
FIG. 17 shows an alternative embodiment organizer system deployed on a workstation desktop and wall.
Figure 18:
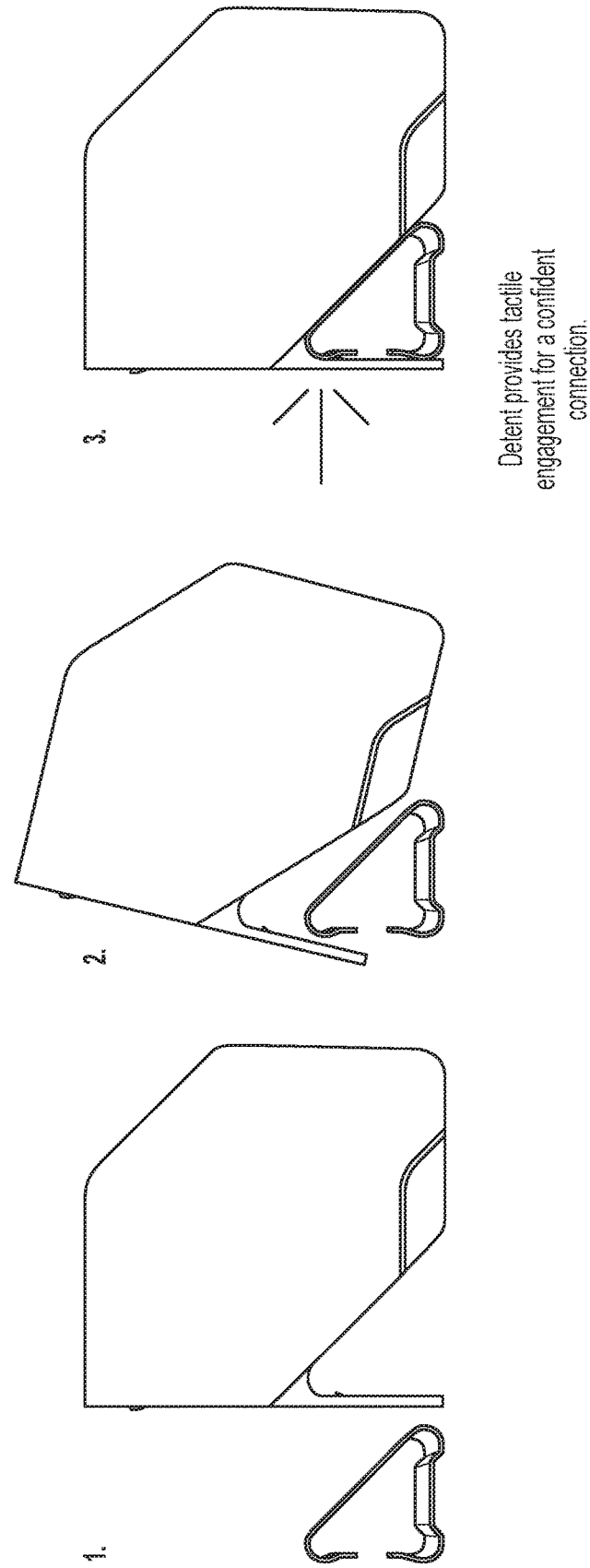
FIG. 18 depicts mounting a bin to the rail.
Figure 19:
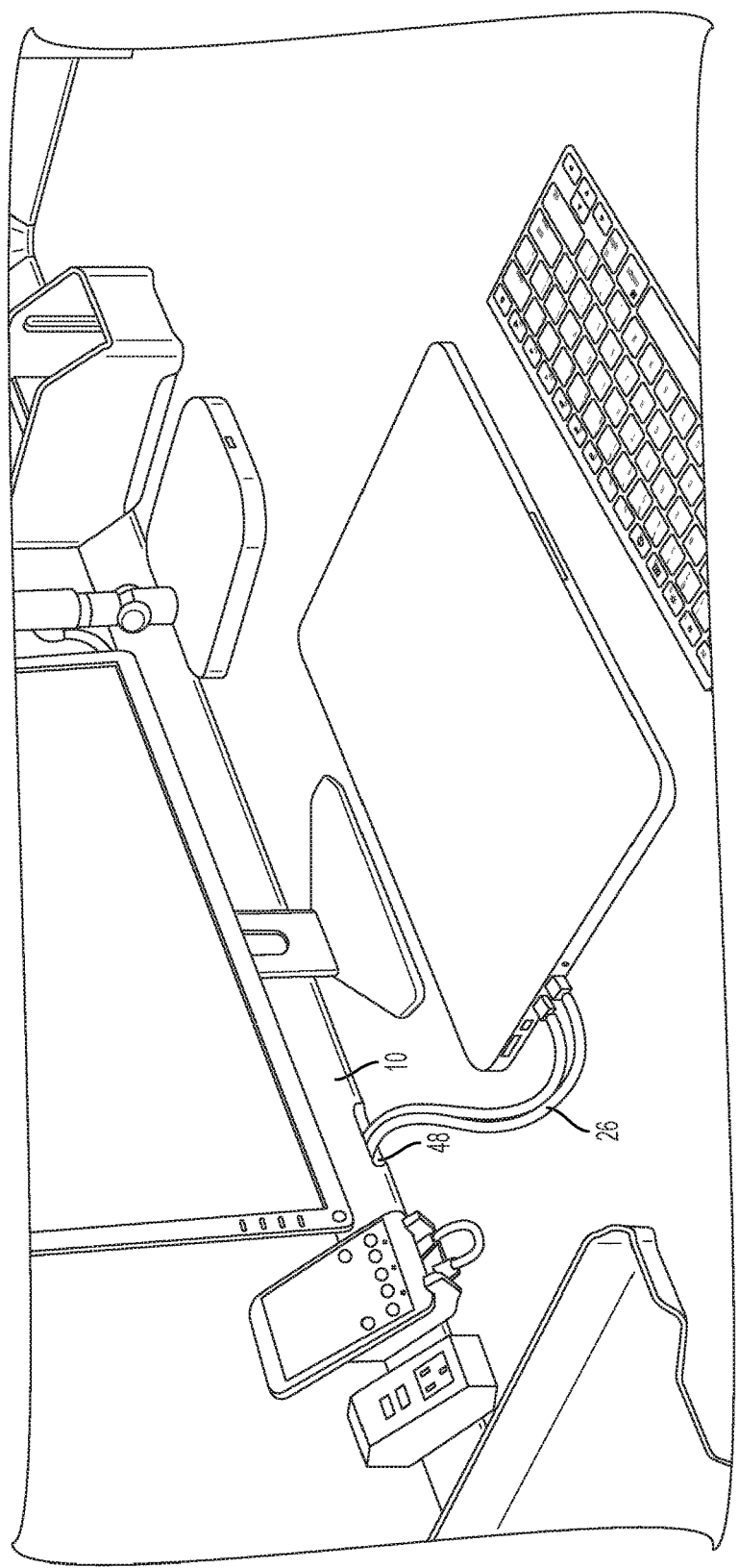
FIG. 19 shows a cable management access port or opening in the rail.
Figure 20:
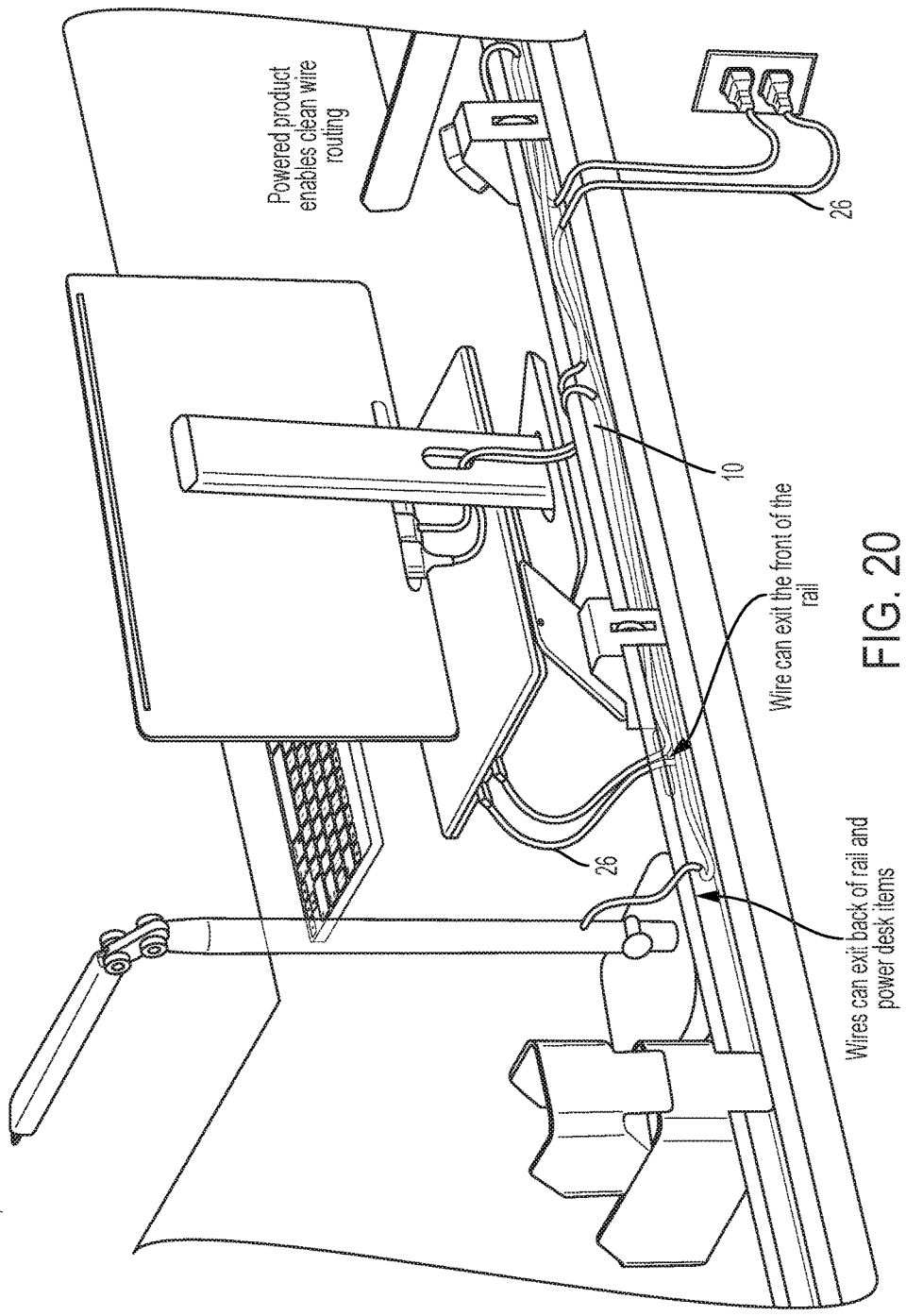
FIGS. 20-21 are different view of the cable management feature of the rail.
Figure 21:
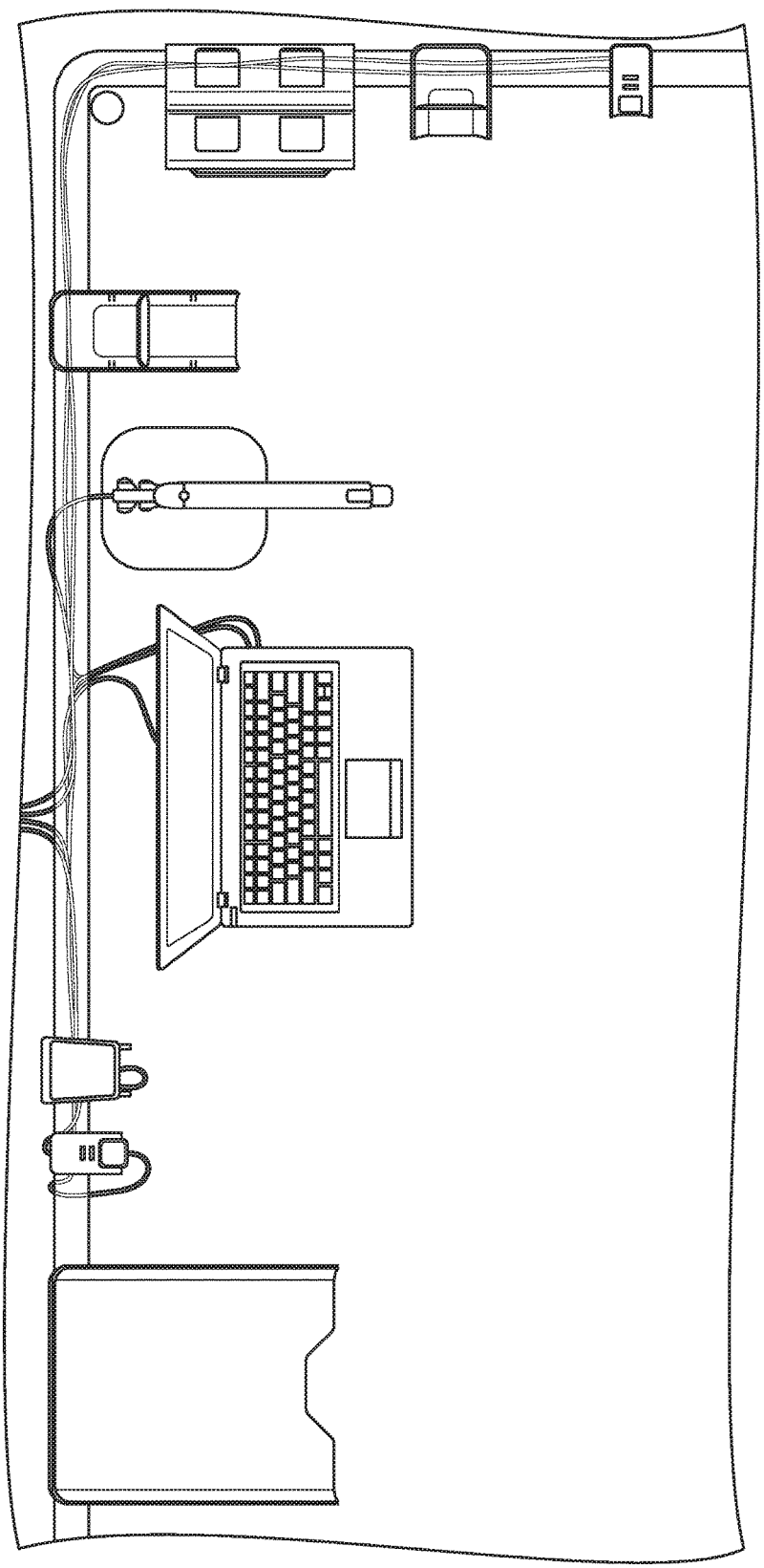
Figure 22:
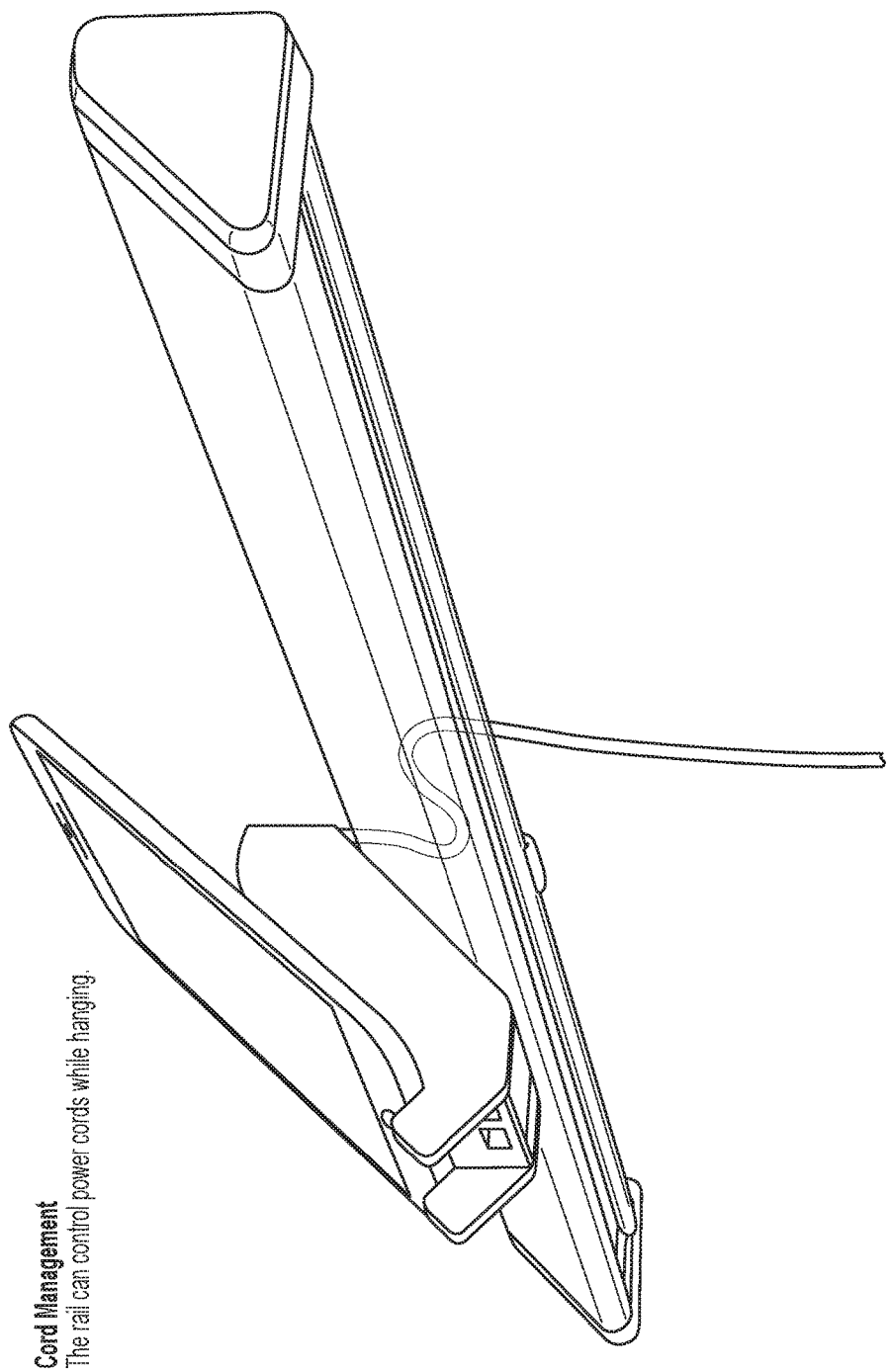
FIG. 22 shows a rail mounted to a wall.
Figure 23:
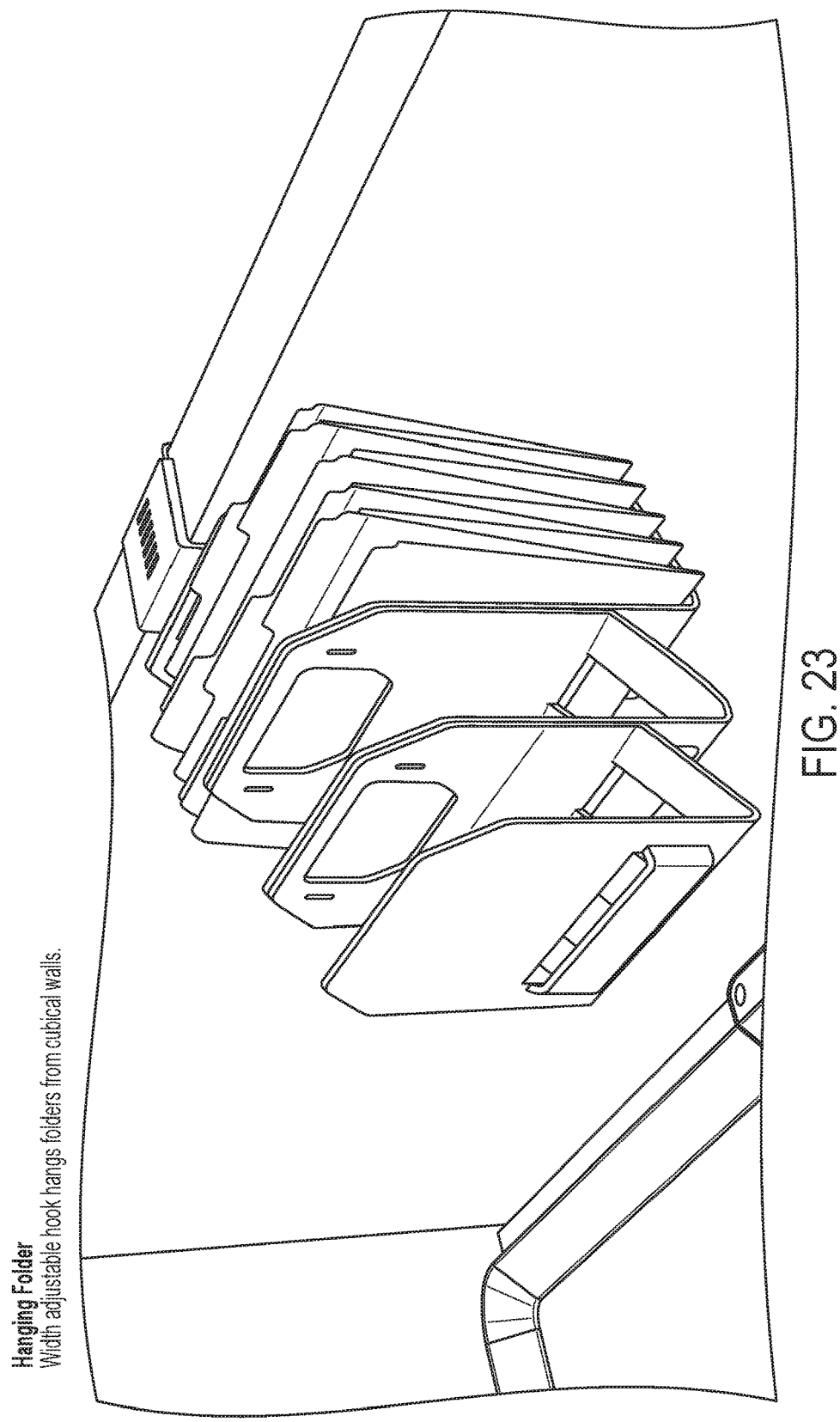
Figure 24:
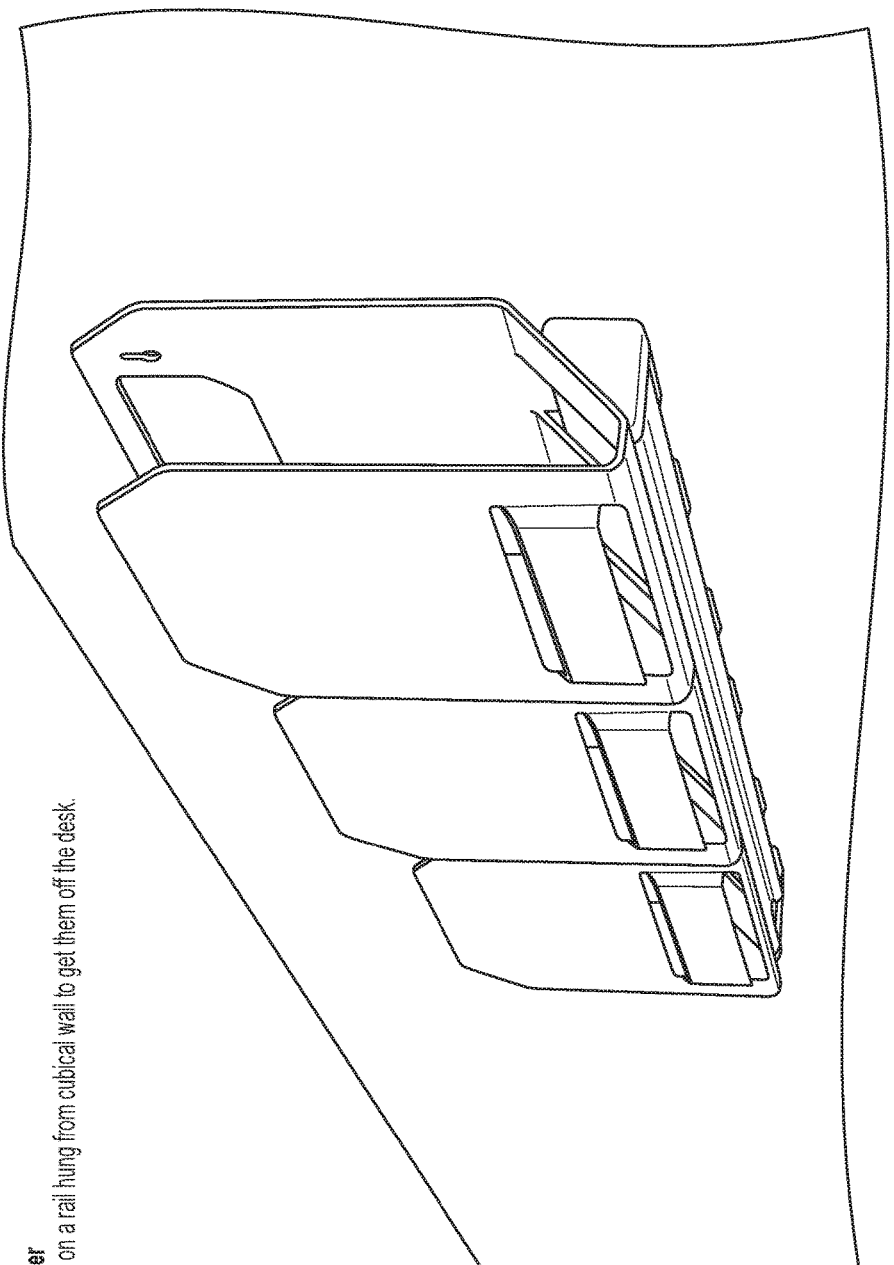

FIG. 17 is a view of the preferred embodiment workstation organizer with the rail and accessories mounted and distributed around the desktop and workstation wall. FIG. 18 is a graphic depiction of a mounting method of an office implement (bin) to the organizer bar. FIG. 19 shows an opening 48 facing the user allowing cables 26 to extend from inside the rail 10 to outside the rail to connect a laptop, for example. FIGS. 20-21 are illustrations of the cable management features of the rail 10. FIG. 22 shows a rail 10 mounted to a wall 54 with an add on office implement (smartphone charging stand) 30 docked thereon. FIGS. 23-25 are alternative embodiment office implements 30, specifically, hanging folders that can be docked to the rail 10 or hung from a divider wall.

While the particular preferred embodiments of the invention have been illustrated and described, it will be apparent that various modifications can be made without departing from the spirit and scope of the invention. It is contemplated that elements from one embodiment may be combined or substituted with elements from another embodiment.

What is claimed is:

1. An office organizer system for a workstation including a desktop and a wall, comprising:
    a first rigid, elongated, tubular section having a polygonal cross-section with a plurality of faces, wherein the tubular section includes a first end and a second end, a slot extending lengthwise along one of the faces of the section, and an attachment means extending lengthwise along one of the faces of the section;
an elongated cover strip including a clamp removably attached to the slot;
    a first connector having a cross-section matching the polygonal cross-section of the tubular section fitted to the first end of the tubular section, wherein the first connector includes at least one of a closed end and a flexible angle bend with an included angle of 0degrees to 360 degrees inclusive, and the first connector having a wall attachment means attachable to the wall;
    a second connector, having a cross-section matching the polygonal cross-section of the tubular section fitted to the second end of the tubular section, wherein the second connector includes at least one of a closed end and a flexible right-angle bend, and the second connector having a wall attachment means attachable to the wall; and
    an add-on office implement having an overarching arm that at least partially overlies the tubular section and engages the attachment means of the tubular section.

2. The office organizer system of claim 1, wherein the tubular section includes a magnetically attractive material, and the first and second connectors and the add-on office implement include a magnet.

3. The office organizer system of claim 1, wherein the system includes a second rigid, elongated, tubular section, attachable via the first connector to the first rigid, elongated, tubular section.

4. The office organizer system of claim 1, wherein the tubular section includes a right triangle cross-sectional shape.

5. The office organizer system of claim 4, wherein the right triangle of the tubular section includes a face adjacent the right angle, which face includes feet supporting the tubular section on the desktop.

6. The office organizer system of claim 1, wherein the tubular section includes a material selected from the group consisting of: polymers, fiberglass, wood, or metal.

7. The office organizer system of claim 1, wherein the tubular section includes spaced apart openings located opposite the face containing the slot.

8. The office organizer system of claim 1, wherein the wall attachment means includes at least one of an eyelet for receiving a push pin, an eyelet for receiving a screw head, a U-shaped hook, and an anchor with a knob with double stick tape.

9. The office organizer system of claim 1, wherein the add-on office implement includes at least one of a storage shelf, a drawer, a pencil box, a tape dispenser, a data input/output port, a bin, a phone dock, a note pad stand, and an AC outlet.

10. A desktop organizer system, comprising:
    a rigid, elongated, tubular section having a triangular cross-section, wherein the tubular section includes a first and a second end, a slot extending lengthwise along a face of the tubular section;
    an elongated cover strip including a hooked lip removably attached to the slot;
    an end cap having a triangular cross-section with an interference fit with the first end of the elongated section, wherein the end cap includes an attachment means for mounting to a wall;
    an interconnect joint having a triangular cross-section with an interference fit with the second end of the elongated section, and having at least one of a straight form and an angled bend, the joint further having an attachment means for mounting to the wall;
    an add-on office implement that includes an overarching arm; and
    an attachment means disposed along a face of the tubular section for attachment of the add-on office implement via the overarching arm.

11. The desktop organizer system of claim 10, wherein the add-on office implement includes at least one of a storage shelf, a drawer, a pencil box, a tape dispenser, a bin, a phone dock, a note pad stand, a data input/output port, and an AC outlet.

12. The desktop organizer system of claim 10, wherein at least one opening is located at a vertex of the triangular section for access to the interior of the tubular section.

13. The desktop organizer system of claim 10, wherein the tubular section includes integrated LEDs with electrical wiring passing along the interior of the tubular section.

14. The desktop organizer system of claim 10, wherein a plurality of rigid, elongated, tubular sections each having a triangular cross-section are interconnected in series by interconnect joints between the tubular sections.

15. An office organizer system for a workstation including a desktop and a wall, comprising:
    a first rigid, elongated, tubular section having a triangular cross-section with a plurality of faces, wherein the tubular section includes a first end and a second end, a slot extending lengthwise along one of the faces of the section, and an attachment means extending lengthwise along one of the faces of the section;
an elongated cover strip including a hooked lip removably attached to the slot;
    a first connector having a cross-section matching the triangular cross-section of the tubular section fitted to the first end of the tubular section, wherein the first connector includes at least one of a closed end and a flexible bend, and the first connector having a wall attachment means attachable to the wall;

a second connector, having a cross-section matching the triangular cross-section of the tubular section fitted to the second end of the tubular section, wherein the second connector includes at least one of a closed end and a flexible bend, and the second connector having a wall attachment means attachable to the wall; and an add-on office implement having an overarching arm that at least partially overlies the tubular section and engages the attachment means of the tubular section.

16. The office organizer system for a workstation of claim 15, wherein the system includes a plurality of tubular sections interconnected in series by at least one of the first connector and the second connector.

17. The office organizer system for a workstation of claim 15, wherein the triangular cross-section is a right-angle triangle with a face of the hypotenuse of the triangle oriented away from the desktop.

18. The office organizer system for a workstation of claim 15, wherein the tubular section is fabricated from sheet aluminum.

19. The office organizer system for a workstation of claim 15, wherein the system includes a pen rack having a vertical height with curved cradles, and the pen rack engages the attachment means of the tubular section.

20. The office organizer system for a workstation of claim 15, wherein the add-on office implement includes at least one of a storage shelf, a drawer, a pencil box, a tape dispenser, a bin, a phone dock, a note pad stand, a data input/output port, and an AC outlet.

* * * * *